(12) United States Patent
Nurishi

(10) Patent No.: US 7,499,227 B2
(45) Date of Patent: Mar. 3, 2009

(54) LENS APPARATUS AND IMAGE-PICKUP APPARATUS

(75) Inventor: Ryuji Nurishi, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/038,390

(22) Filed: Feb. 27, 2008

(65) Prior Publication Data

US 2008/0137215 A1   Jun. 12, 2008

Related U.S. Application Data

(63) Continuation of application No. 11/690,352, filed on Mar. 23, 2007, now Pat. No. 7,362,512.

(30) Foreign Application Priority Data

Mar. 30, 2006   (JP)   ............... 2006-094122

(51) Int. Cl.
 G02B 15/14   (2006.01)
 G02B 7/26   (2006.01)
(52) U.S. Cl. ................... 359/698; 359/697; 396/301
(58) Field of Classification Search ................ 359/697, 359/694, 819, 823, 824; 396/88, 95, 111, 396/114, 301
 See application file for complete search history.

(56) References Cited

U.S. PATENT DOCUMENTS 5,142,318 A * 8/1992 Taniguchi et al. ............. 396/91
6,029,017 A * 2/2000 Miyazawa et al. ........... 396/532

* cited by examiner

*Primary Examiner*—Mohammed Hasan
(74) *Attorney, Agent, or Firm*—Cowan, Liebowitz & Latman, P.C.

(57) ABSTRACT

Provided is a lens apparatus mounted to a camera including an image-pickup element, including: a focus lens means movable in an optical axis direction for focusing; a zoom lens unit; a zoom detector for detecting a zoom value of the zoom lens unit; an aperture-stop device; a stop-value detector; a splitting optical unit; a focus-condition detection unit; an actuator; a controller for controlling the actuator based on an output from the focus-condition detection unit; and a manual operation member, wherein the controller obtains an F-number of the lens apparatus based on outputs from the zoom detector and stop-value detector and when the F-number exceeds a predetermined value, the controller causes the actuator to stop the focus lens unit and switches to a condition in which the focus lens unit is driven by the manual operation member.

6 Claims, 9 Drawing Sheets

LENS APPARATUS AND IMAGE-PICKUP APPARATUS

CROSS-REFERENCE TO RELATED APPLICATIONS

This application is a continuation of application Ser. No. 11/690,352, filed Mar. 23, 2007 now U.S. Pat. No. 7,362,512, the entire disclosure of which is hereby incorporated by reference.

BACKGROUND OF THE INVENTION

1. Field of the Invention

The present invention relates to a lens apparatus including a splitting optical unit disposed on an optical path of an image-pickup optical system, for performing automatic focus based on a light beam from the splitting optical unit, and to an image-pickup apparatus including the lens apparatus.

2. Description of the Related Art

Up to now, various automatic focus techniques for an image-taking apparatus such as a still camera or a video camera have been proposed. For example, Japanese Patent Application Laid-Open No. H09-274130 discloses a lens and image-pickup apparatus in which a splitting optical unit is disposed on an optical path thereof and a focus-condition detector based on phase-difference detection is disposed on a split optical path from the splitting optical unit.

According to the still camera, after performing the automatic focus control while an aperture stop is opened, a light quantity is adjusted by stopping down by the aperture stop, and then shooting can be performed. On the other hand, taking moving picture for broadcast, video, or cinema is constantly in a shooting state, so the automatic focus control is demanded under any stop state.

In the case of shooting a moving picture, a dividing optical unit is disposed on an image side of the aperture stop and phase-difference detection is performed based on a light beam obtained by division. In such a case, when stopped down to a value smaller than a threshold value, because, for example, a subject is bright, a pupil of a secondary imaging lens is vignetted. As a result, a phase difference cannot be detected accurately, so automatic focus precision deteriorates to cause a malfunction.

When stopped down more, the pupil of the secondary imaging lens may be completely vignetted, so the phase difference cannot be detected to perform the automatic focus control.

When a dividing optical unit is provided on an object side of an aperture stop as in the first Embodiment disclosed in Japanese Patent Application Laid-Open No. H09-274130, the above-mentioned problems do not occur. However, a size of the entire optical system increases.

SUMMARY OF THE INVENTION

An object of the present invention is to provide a small and light-weight lens apparatus capable of switching between automatic focus controls at a time of the shooting with stop-down and performing the shooting depending on an intention of a photographer, and an image-pickup apparatus including the lens apparatus.

According to a first aspect of the present invention, the present invention provides a lens apparatus for mounting on a camera including an image-pickup element, which comprises a focus lens unit which is movable in an optical axis direction for focusing; a zoom lens unit which is movable in the optical axis direction for zooming; a zoom detector for detecting a zoom value of the zoom lens unit; an aperture-stop device in which an aperture which can change in size to adjust a light quantity; a stop-value detector for detecting a stop value of the aperture-stop device; a splitting optical unit disposed between the aperture-stop device and the image-pickup element; a focus-condition detection unit for detecting a focus condition based on light from the splitting optical unit; an actuator for driving the focus lens unit in the optical axis direction; a controller for controlling the actuator based on an output from the focus-condition detection unit; and a manual operation member for moving the focus lens unit in the optical axis direction by a manual operation, wherein: the controller is configured to obtain an F-number of the lens apparatus based on an output from the zoom detector and an output from the stop-value detector; and when the F-number, adjustable by the stop value of the aperture stop device, exceeds a predetermined value, the controller causes the actuator to stop movement of the focus lens unit and switches to a condition in which the focus lens unit can be driven by the manual operation member.

Further features of the present invention will become apparent from the following description of exemplary embodiments with reference to the attached drawings.

DESCRIPTION OF THE EMBODIMENTS

Hereinafter, embodiments of the present invention will be described in detail with reference to the attached drawings.

A phase-difference detection system in the embodiments includes a primary imaging lens for imaging a split light beam, a field lens disposed close to an expected imaging plane of the primary imaging lens, and a secondary imaging optical system disposed in the rear of the field lens. According to such a system, a set of object images are formed based on light beams passing through different portions of the pupil of an imaging optical system. Each of the object images is detected by a photoelectric conversion element array disposed in the rear of the secondary imaging optical system. A phase difference is detected by a focus-detection apparatus for determining a focus condition of the imaging optical system based on a relative deviation amount between the object images.

First Embodiment

Figure 1:
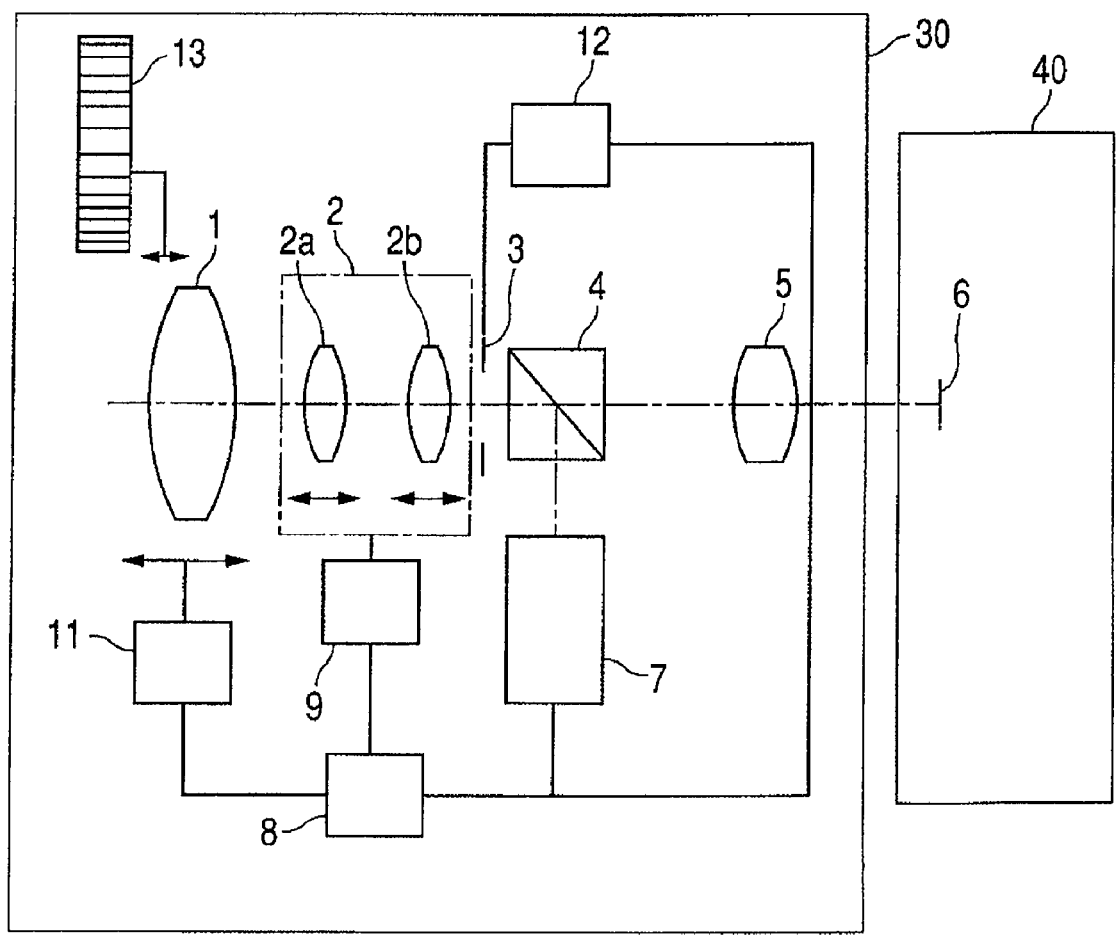
FIG. 1 is a structural diagram illustrating a first Embodiment of the present invention.

FIG. 1 is a structural diagram illustrating a lens apparatus and a camera according to a first Embodiment.

As illustrated in FIG. 1, a lens apparatus 30 includes a focus movable lens unit 1, a magnification movable lens unit 2, an aperture stop device 3, a splitting optical unit 4, and a relay lens unit 5, which are disposed along an optical axis. A camera 40 includes an image-pickup element 6.

The magnification movable lens unit 2 includes a magnification variator 2a and a compensator 2b for compensating for an image plane variation caused by magnification. A focus-condition detector 7 is disposed in a division direction of the splitting optical unit 4. An output of the focus-condition detector 7 is connected with a CPU 8. An output of a zoom detector 9 of the magnification adjustment lens unit 2 is connected with the CPU 8. In addition, respective outputs of the CPU 8 are connected with a focus actuator 11 and an aperture-stop control circuit 12 in order to drive the focus movable lens unit 1 and the aperture-stop device 3. The aperture-stop control circuit 12 detects a stop value of the aperture-stop device 3 and outputs the detected stop value to the CPU 8. A manual operation member 13 is manually operated to move the focus movable lens unit 1 manually.

The focus-condition detector 7 outputs, to the CPU 8, a focus detection value obtained based on a light beam split by the splitting optical unit 4. The CPU 8 performs calculation based on the focus detection value and causes the focus actuator 11 to move the focus movable lens unit 1 in the optical axis direction. Therefore, automatic focus control is performed.

The CPU 8 has an associated memory (not shown) which is used to store one or more programs for running on the CPU 8. In other embodiments, the functions of the CPU 8 may be performed by an integrated circuit, logic chip, or the like, which are configured to carry out the steps of the program.

In order to perform light-quantity adjustment, the aperture-stop device 3 is driven by the CPU 8 through the aperture-stop control circuit 12 based on a luminance signal of the image-pickup element 6.

Figure 2:
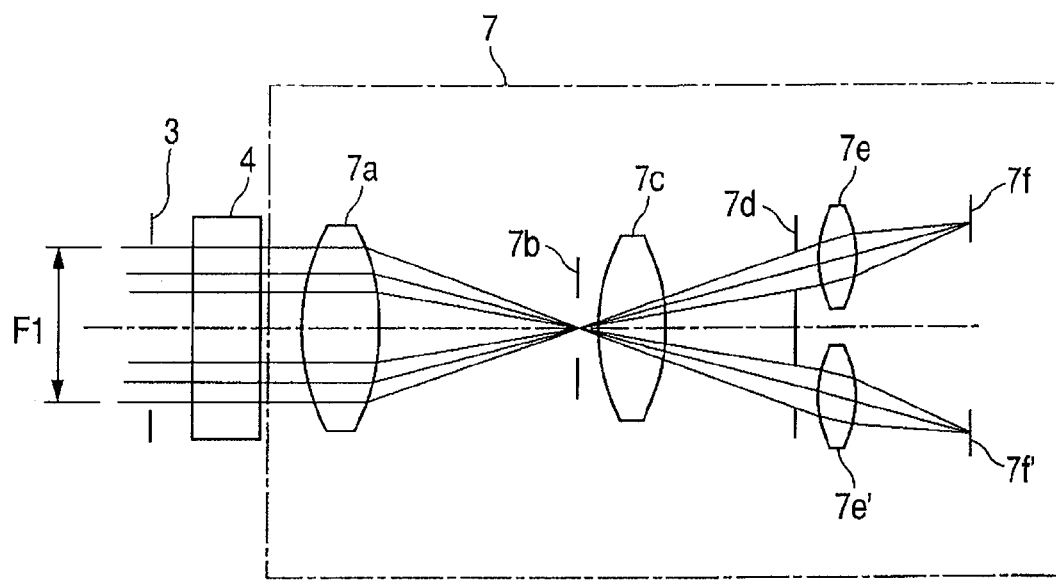
FIG. 2 is an optical structural diagram illustrating a focus-condition detector.

FIG. 2 is an optical structural diagram illustrating the focus-condition detector 7. As illustrated in FIG. 2, a primary imaging lens 7a, a field stop 7b, a field lens 7c, an aperture stop 7d including two aperture portions are disposed on the optical axis in the division direction of the splitting optical unit 4 through the aperture-stop device 3. A set of light-receiving element arrays 7f and 7f' are disposed in light exit directions of the two aperture portions of the aperture stop 7d through a set of secondary imaging lenses 7e and 7e'. The field stop 7b and the field lens 7c are provided on an expected imaging plane of the primary imaging lens 7a.

The field lens 7c has a function of imaging light beams passing through the aperture stop 7d and the secondary imaging lenses 7e and 7e' on two regions disposed symmetrical with each other with respect to the optical axis of the primary imaging lens 7a. The light beams that have passed through the respective regions generate light-quantity distributions on the light receiving element arrays 7f and 7f'. Outputs of the light receiving element arrays 7f and 7f' are sent to the CPU 8.

In the focus-condition detector 7 illustrated in FIG. 2, when an imaging point of the primary imaging lens 7a is located on the front side of the expected imaging plane, light-quantity distributions related to object images formed on the two light-receiving element arrays 7f and 7f' are close to each other.

When the imaging point of the primary imaging lens 7a is located on the rear side of the expected imaging plane, light-quantity distributions generated on the two light receiving element arrays 7f and 7f' are separated from each other.

A deviation amount between the light-quantity distributions generated on the two light receiving element arrays 7f and 7f' has a functional relation with a focus deviation amount of the primary imaging lens 7a. When the deviation amount is calculated by the CPU 8, the focus deviation of the primary imaging lens 7a, that is, a focus deviation direction and a focus deviation amount of the imaging optical system can be detected.

Assume that an F-number of an optical system from the focus movable lens unit 1 to the image-pickup element 6, which corresponds to a minimum stop diameter of the aperture-stop device 3 including two regions, is a threshold value F1. The F-number is expressed by f/D where f denotes a focal length of the optical system and D denotes an entrance pupil diameter. In the case of the focus-condition detector 7 including two or more sets of secondary imaging lenses, the threshold value F1 is calculated based on two regions provided on the aperture-stop device 3, which correspond to the secondary imaging lenses 7e and 7e' having a shortest base length.

Figure 3:
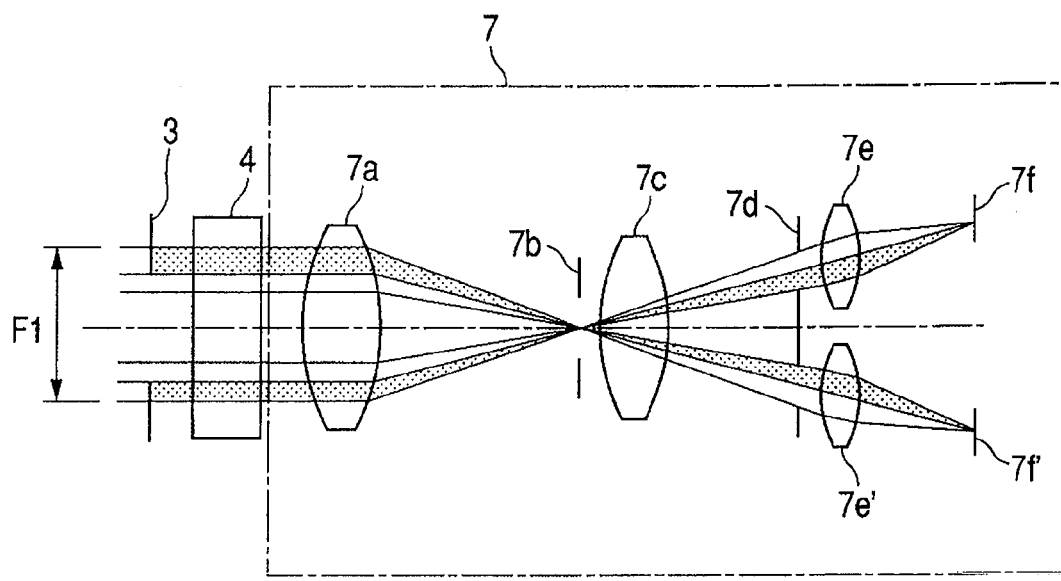
FIG. 3 is an optical path diagram illustrating a state where an aperture stop is stopped down so that a stop value exceeds a threshold value of an F-number.

As illustrated in FIG. 3, when the aperture-stop device 3 is stopped down such that a stop value exceeds the threshold value F1 of the F-number, a light beam passing through the aperture stop 7d is vignetted. Therefore, the barycenter of each of the light-quantity distributions generated on the two light receiving element arrays 7f and 7f' is displaced, so an accurate deviation amount between the light-quantity distributions cannot be measured. When the light quantity reduces to increase a storage time or to lower an S/N ratio, an accurate focus condition cannot be detected.

Figure 4:
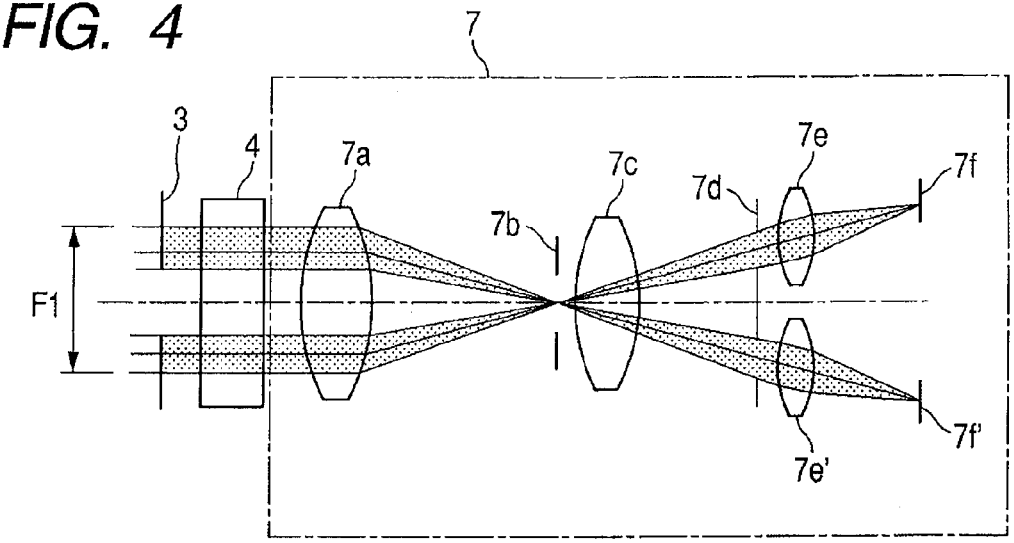
FIG. 4 is an optical path diagram illustrating a state where the aperture stop is further stopped down so that the stop value exceeds the threshold value of the F-number.

As illustrated in FIG. 4, when the aperture-stop device 3 is further stopped down, the light beams do not reach the two light receiving element arrays 7f and 7f', so the focus condition cannot be detected.

Figure 5:
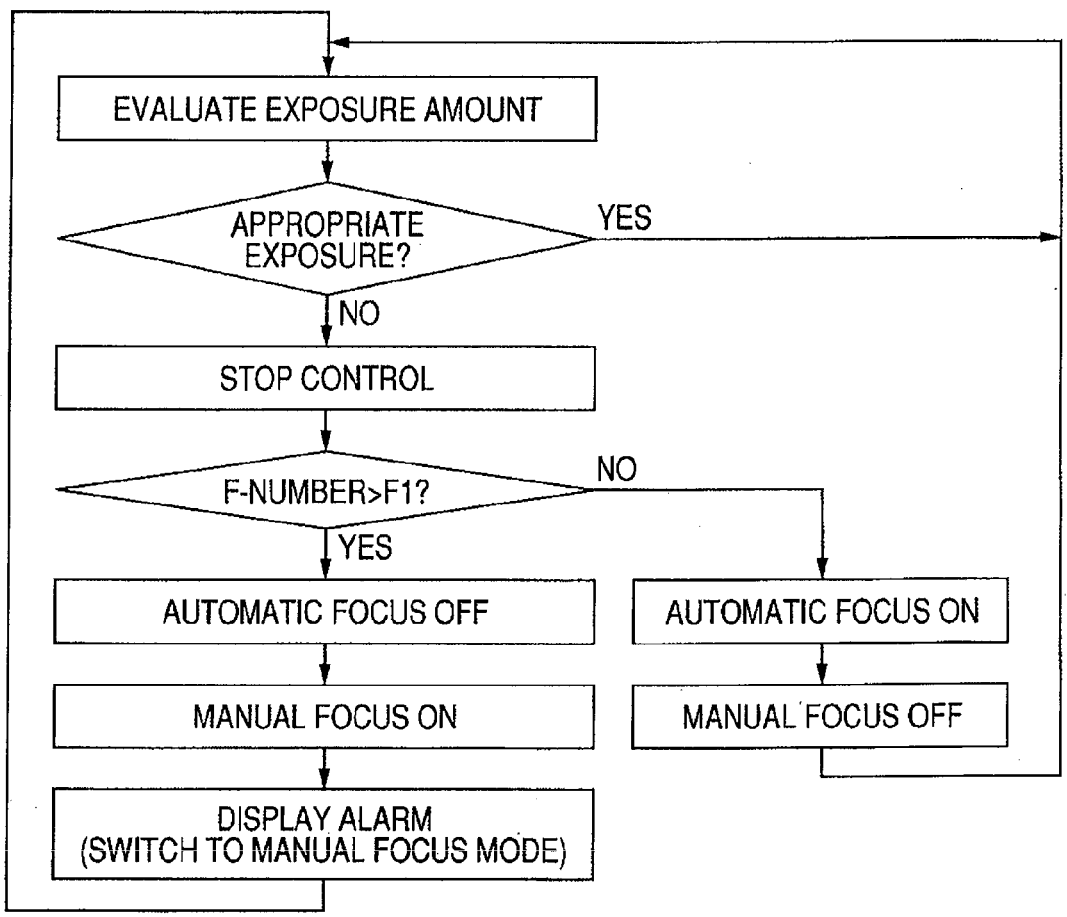
FIG. 5 is a flowchart illustrating an operation in a first Embodiment of the present invention.

Therefore, in this embodiment, the adjustment of the aperture-stop device 3 and the automatic focus control are performed based on the flowchart illustrated in FIG. 5. When the aperture-stop device 3 is stopped down such that the stop value exceeds the threshold value F1 (=F/8) of the F-number to increase the numeral value of the F-number, the operation of the focus actuator 11 is suspended by the CPU 8 in response to the output of the focus-condition detector 7 to stop the movement of the focus movable lens unit 1 in the optical axis direction (automatic focus). Then, the focus movable lens unit 1 is switched to a manual operation condition (manual focus condition) by the manual operation member 13. An alarm indicating that the focus movable lens unit 1 is switched to the manual focus condition is displayed on a display device (not illustrated) of the camera 40. When the F-number is smaller than the threshold value F1, the automatic focus control continues or the operation returns to the automatic focus control.

In order to prevent a reduction in resolution of a video picture, it is preferable to control the threshold value F1 of the F-number in a range in which an Airy disk diameter does not exceed a pixel pitch of the image-pickup element 6. Therefore, it is desirable to ensure the automatic focus control in this range. Thus, it is desirable that the threshold value F1 satisfies the following expression where $\lambda$ denotes a center wavelength of a wavelength range in which the image-pickup element 6 has sensitivity and P denotes the pixel pitch of the image-pickup element 6.

$$1.22 \cdot \lambda \cdot F1/P > 1 \qquad (1)$$

In this embodiment, for example, ⅔ type CCD is used as the image-pickup element 6. An image screen size is 9.6 mm in a lateral direction and 5.4 mm in a longitudinal direction. The number of pixels is 1920 in the lateral direction and 1080 in the longitudinal direction. The pixel pitch P is 0.005 mm. The use wavelength range is 400 nm to 700 nm. The center wavelength λ is 550 nm (=5.5·10⁻⁴ mm). Therefore, the left side of the expression (1) is calculated as shown in the following expression. Thus, it is apparent that the condition of the expression (1) is satisfied.

$$1.22 \cdot 5.5 \cdot 10^{-4} \cdot 8/0.005 = 1.0736 \quad (2)$$

Second Embodiment

Figure 6:
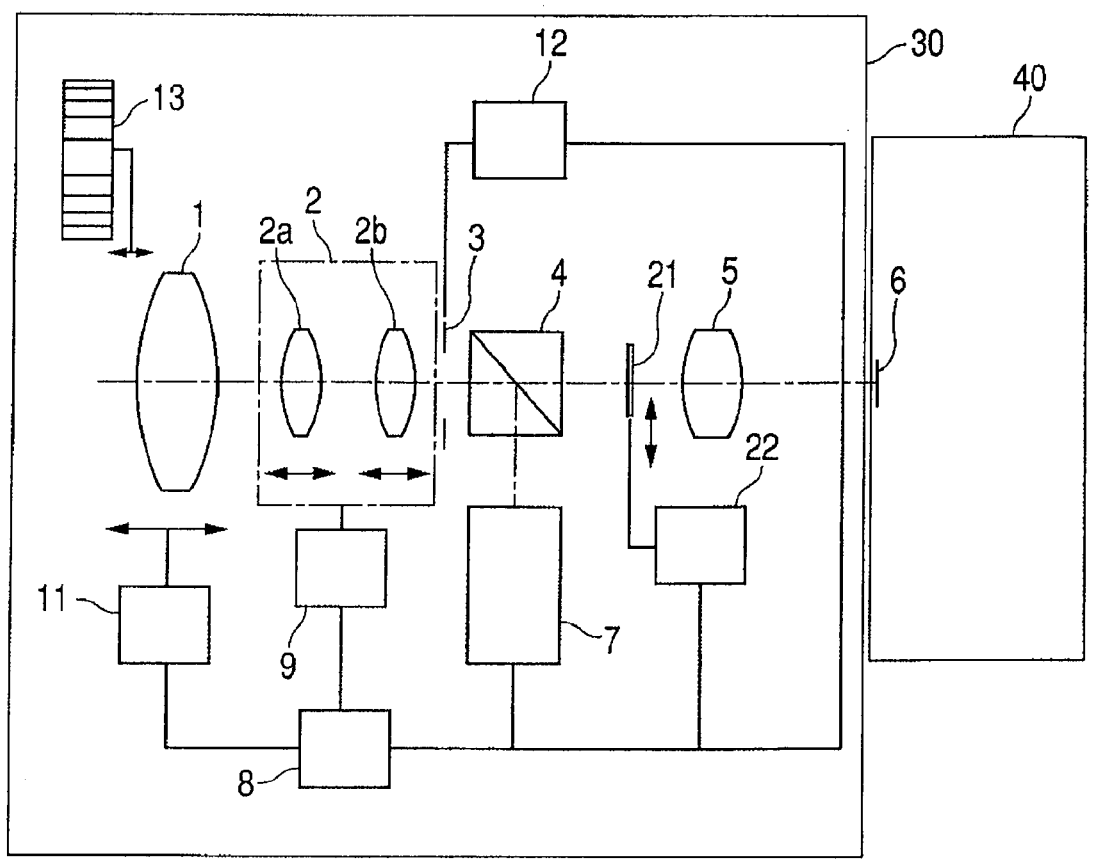
FIG. 6 is a structural diagram illustrating a second Embodiment of the present invention.

FIG. 6 is a structural diagram illustrating a lens apparatus and a camera according to a second Embodiment. In FIG. 6, the same portions as those illustrated in FIG. 1 are expressed by the same reference symbols. In this embodiment, a second light-quantity-adjusting member 21 which is an ND filter is disposed on an optical axis between the splitting optical unit 4 and the relay-lens unit 5, unlike the first Embodiment described with reference to FIG. 1. The second light-quantity-adjusting member (ND filter) 21 can be inserted into or removed from the optical path by an actuator 22 driven in response to a command from the CPU 8. The second light-quantity-adjusting member 21 has an effect of reducing a light quantity for the image-pickup element 6 to ¼ which corresponds to 2 in stop value. An F-number F2 in the case where the ND filter is inserted is set by the following expression.

$$F2 = F1/2 \quad (3)$$

In the second Embodiment, there are two light-quantity-adjustment modes. In a first light-quantity-adjustment mode, as same as in the first Embodiment, the automatic focus and the manual focus are switched therebetween based on the F-number according to the operational flowchart illustrated in FIG. 5.

Figure 7:
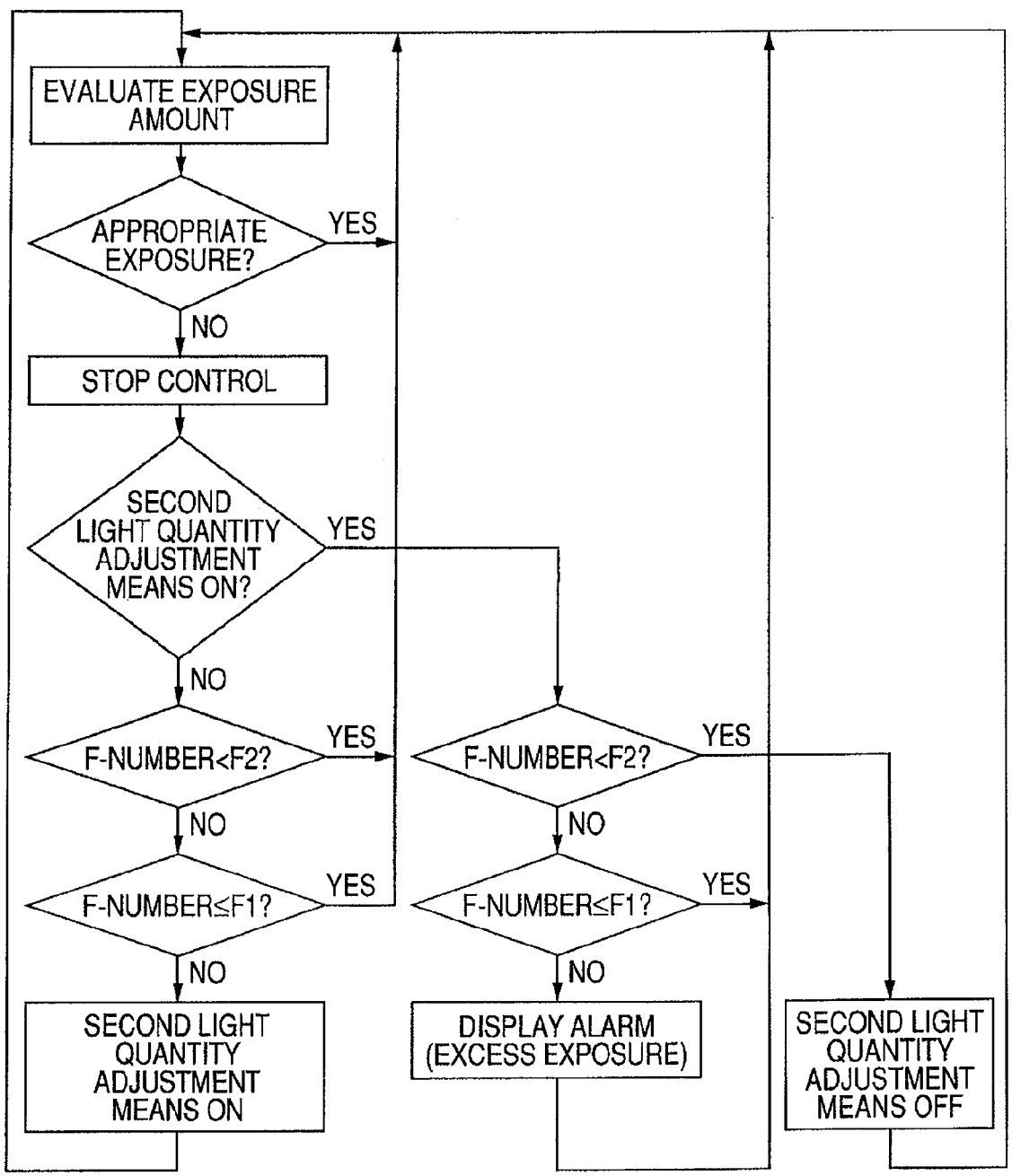
FIG. 7 is a flowchart illustrating an operation in a second Embodiment of the present invention.

In a second light-quantity-adjustment mode, the aperture-stop device 3 is controlled according to a flowchart illustrated in FIG. 7 such that the stop value does not exceed the threshold value F1 of the F-number. The second light-quantity-adjusting member 21 is inserted into the optical path in order to continue the automatic focus control. When the F-number becomes equal to or smaller than F2, the second light-quantity-adjusting member 21 is automatically removed from the optical path.

Third Embodiment

Figure 8:
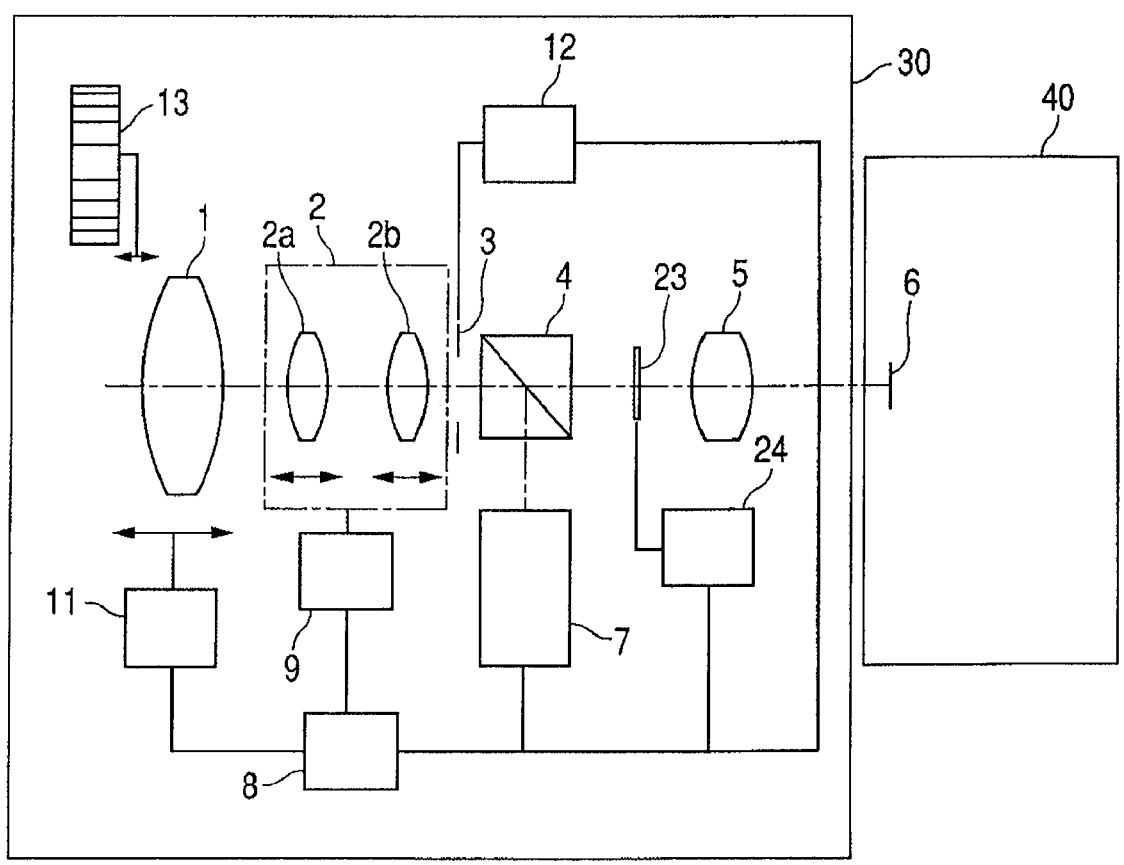
FIG. 8 is a structural diagram illustrating a third Embodiment of the present invention.

FIG. 8 is a structural diagram illustrating a lens apparatus and a camera according to a third Embodiment. In FIG. 8, the same portions as those in the above-mentioned embodiments are expressed by the same reference symbols. In the third Embodiment, continuous light-quantity adjustment can be performed using a second light-quantity-adjusting member 23 by an actuator 24, unlike the second Embodiment described with reference to FIG. 6. For example, a physical stop or a graduation ND filter is used as the second light-quantity-adjusting member 23.

Also in the third Embodiment, there are two light-quantity-adjustment modes. In a first light-quantity-adjustment mode, as in the first Embodiment, the automatic focus and the manual focus are switched therebetween based on the F-number according to the operational flowchart illustrated in FIG. 5.

Figure 9:
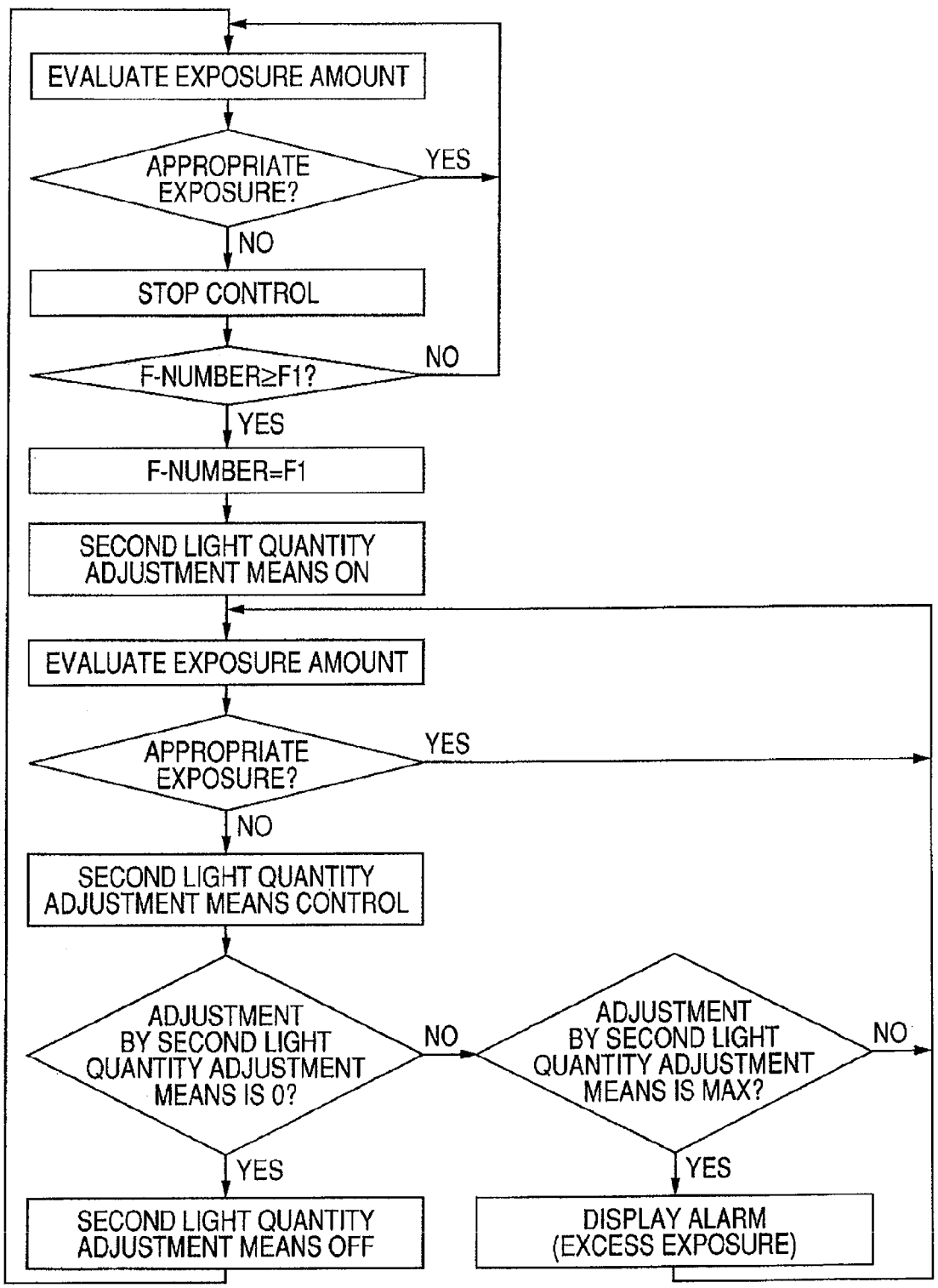
FIG. 9 is a flowchart illustrating an operation in a third Embodiment of the present invention.

In a second light-quantity-adjustment mode, the aperture-stop device 3 is controlled according to a flowchart illustrated in FIG. 9. That is, when a light quantity of a subject increases and the F-number reaches the threshold value F1, light-quantity adjustment is switched to be carried out by the second light-quantity-adjusting member 23 and the automatic focus control continues while the aperture-stop device 3 is held at the threshold value F1. When a light control amount adjusted by the second light-quantity-adjusting member 23 becomes zero, the operation returns to the light-quantity adjustment using the aperture-stop device 3.

Fourth Embodiment

Figure 10:
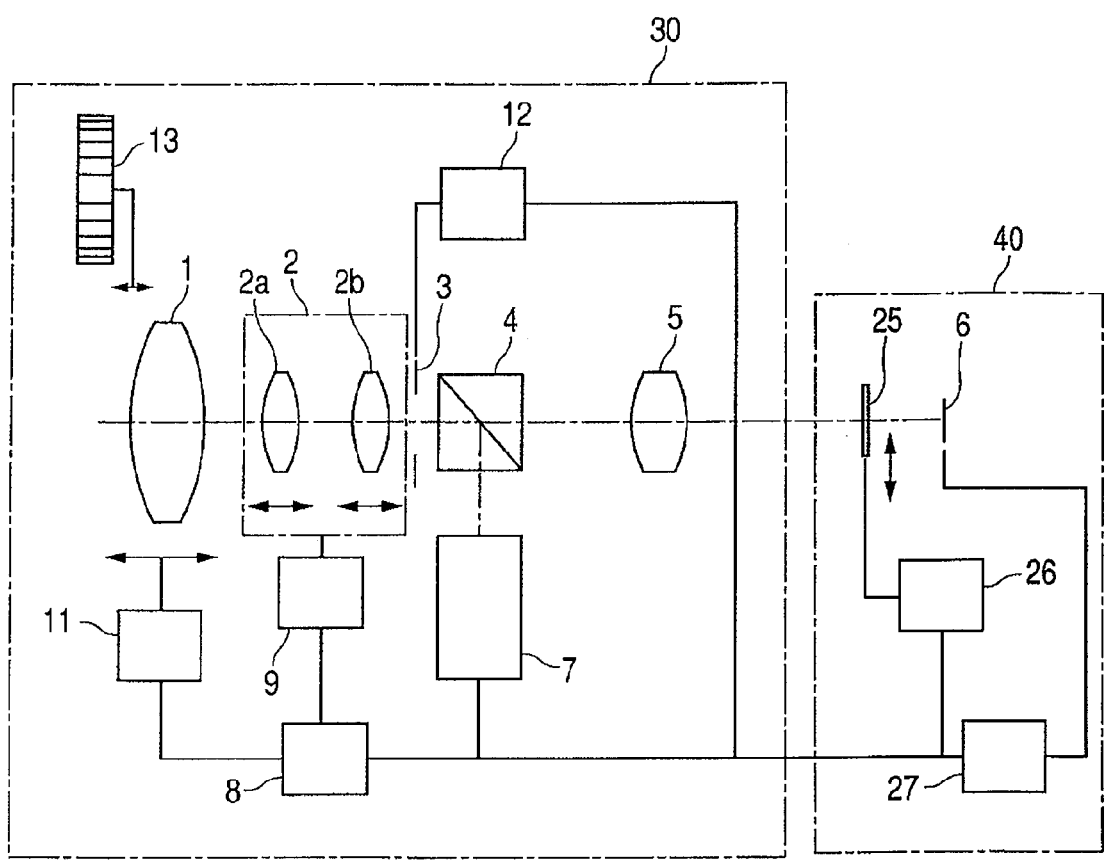
FIG. 10 is a structural diagram illustrating a fourth Embodiment of the present invention.

FIG. 10 is a structural diagram illustrating an image-pickup apparatus including a lens apparatus and a camera according to a fourth Embodiment. In FIG. 10, the lens apparatus 30 is mounted on the camera 40.

The image-pickup element 6 is disposed in the camera 40. A second light-quantity-adjusting member 25 which is an ND filter is disposed in front of the image-pickup element 6. The second light-quantity-adjusting member 25 is driven so as to be inserted into or removed from the optical path by an actuator 26. A luminance signal of the image-pickup element 6 is output to the CPU 8 through a second CPU 27 for light-quantity adjustment. The second light-quantity-adjusting member 25 has an effect of reducing a light quantity to ¼ which corresponds to 2 in stop value. The F-number F2 is set to F1/2.

In the fourth Embodiment, there are two light-quantity-adjustment modes. In a first light-quantity-adjustment mode, as in the first Embodiment, the automatic focus and the manual focus are switched therebetween based on the F-number adjusted by the aperture-stop device 3 according to the operational flowchart illustrated in FIG. 5. In a second light-quantity-adjustment mode, the aperture-stop device 3 is controlled according to the flowchart illustrated in FIG. 7 such that the stop value does not exceed the threshold value F1 of the F-number. By inserting second light-quantity-adjusting member 25 into the optical path, the light quantity is adjusted by the second CPU 27 based on the output of the image-pickup element 6. When the F-number becomes smaller than F2, the second light-quantity-adjusting member 25 is automatically removed from the optical path.

Fifth Embodiment

Figure 11:
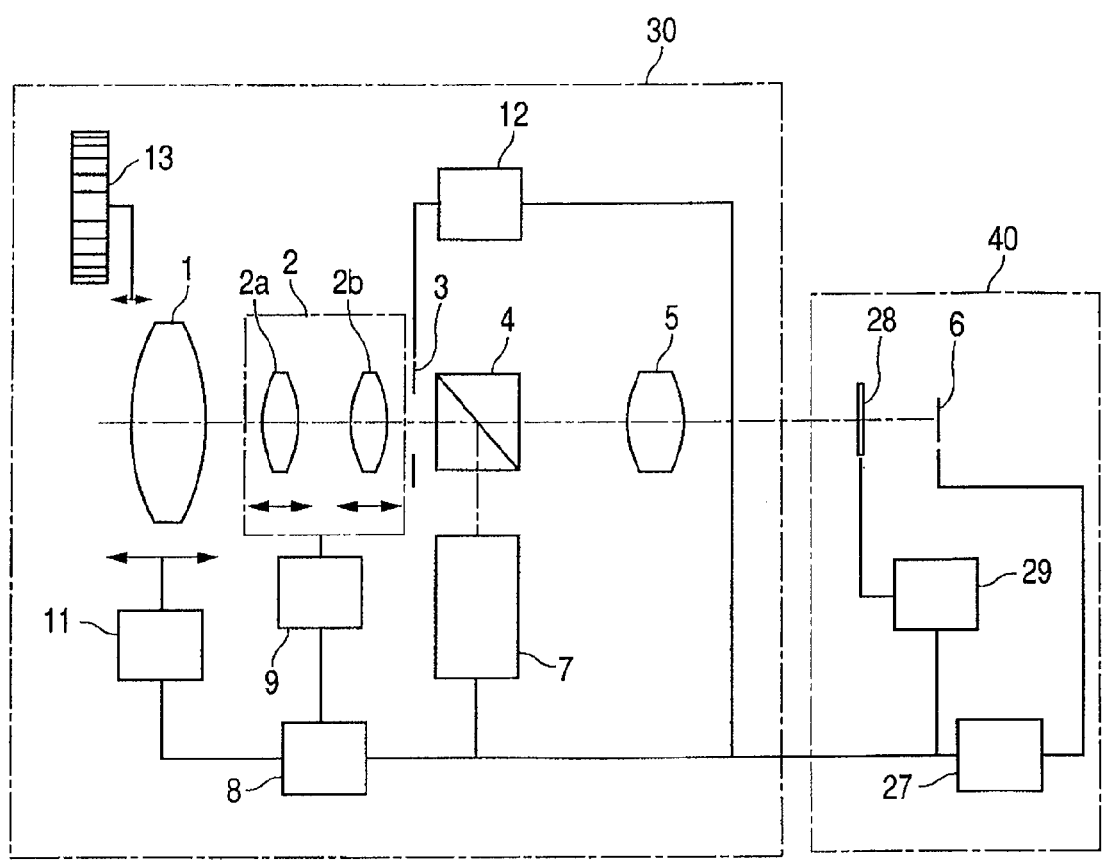
FIG. 11 is a structural diagram illustrating a fifth Embodiment of the present invention.

FIG. 11 is a structural diagram illustrating an image-pickup apparatus including a lens apparatus and a camera according to a fifth Embodiment. In the fifth Embodiment, a second light-quantity-adjusting member 28 is a shutter adjustment aperture stop. continuous light-quantity adjustment can be performed using the second light-quantity-adjusting member 28 by an actuator 29.

In the fifth Embodiment, there are two light-quantity-adjustment modes. In a first light-quantity-adjustment mode, as in the first Embodiment, the automatic focus and the manual focus are switched therebetween based on the F-number adjusted by the aperture-stop device 3 according to the flowchart illustrated in FIG. 5.

In a second light-quantity-adjustment mode, the aperture-stop device 3 is controlled according to the flowchart illustrated in FIG. 9. When a light quantity of a subject increases and the F-number reaches the threshold value F1, the F-number adjusted by the aperture-stop device 3 is held to the threshold value F1. Then, the operation of the actuator 29 is controlled by the second CPU 27 to control a shutter speed of the second light-quantity-adjusting member 28, thereby adjusting the light quantity. When a light control amount adjusted by the second light-quantity-adjusting member 28 becomes zero, the operation returns to the light-quantity adjustment using the aperture-stop device 3.

In the fifth Embodiment, the shutter adjustment aperture-stop is used as the second light-quantity-adjusting member 28. However, if a variable ND filter is used or a camera gain is adjusted, the same effect is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the embodiments, the automatic focus control at the time of stop-down for image taking can be performed depending on the intention of a photographer, and reductions in size and weight can be realized.

This application claims the benefit of Japanese Patent Application No. 2006-094122, filed Mar. 30, 2006, which is hereby incorporated by reference herein in its entirety.

What is claimed is:

1. A lens apparatus, comprising
a focus lens unit,
an adjustable aperture stop,
wherein the lens apparatus includes a first focusing mode in which the focus lens unit moves based on an output from a focus-condition detector which detects a focus condition and a second focusing mode in which the focus lens unit moves by a manual operation, and
wherein the first focusing mode is prohibited and the second focusing mode is executed if an F-number of the adjustable aperture stop exceeds a predetermined value.

2. An apparatus according to claim 1, including a splitting optical unit which spits the light beam to be shot which has traveled through the focus lens,
wherein the focus-condition detector detects the focus condition by using the light beam split by the splitting optical unit.

3. An apparatus according to claim 1, further comprising:
a zoom lens unit disposed on a reduction side of the focus lens unit;
an aperture-stop disposed on a reduction side of the zoom lens unit;
a splitting optical unit disposed on a reduction side of the aperture-stop;
a focus-condition detector which detects the focus condition by using the light beam split by the splitting optical unit; and
a CPU which determine whether an F-number which depends on the zoom lens unit and the aperture-stop exceeds the predetermined value or not.

4. A camera, comprising:
an image pickup element; and
a lens apparatus which guides a light beam to be shot from an object to the image pickup element,
wherein the lens apparatus includes a first focusing mode in which the focus lens unit moves based on an output from a focus-condition detector which detects a focus condition and a second focusing mode in which the focus lens unit moves by a manual operation, and
wherein in a condition where an F-number exceeds a predetermined value, the first focusing mode is prohibited and the second focusing mode is executed.

5. A camera according to claim 4, wherein the camera can shoot a moving picture.

6. A method of controlling a lens apparatus which includes a first focusing mode in which a focus lens unit moves based on an output from a focus-condition detector which detects a focus condition and a second focusing mode in which the focus lens unit moves by a manual operation, the method including the steps of:
determining whether an F-number of the lens apparatus exceeds a predetermined value or not; and
prohibiting the first focusing mode and executing second focusing mode in a case the F-number exceeds the predetermined value.

* * * * *